United States Patent

Crichton et al.

[11] Patent Number: 6,132,832
[45] Date of Patent: Oct. 17, 2000

[54] TILE GLAZE

[75] Inventors: Steven N. Crichton, Parma, Ohio; Paolo Bertocchi, Reggio Emilia, Italy; Yuan Cao, San Angelo, Tex.

[73] Assignee: Ferro Corporation, Cleveland, Ohio

[21] Appl. No.: 09/074,178

[22] Filed: May 7, 1998

[51] Int. Cl.[7] .................................................... B32B 3/14
[52] U.S. Cl. .................... 428/49; 428/425.6; 428/425.9; 428/426; 428/428; 428/432
[58] Field of Search ..................... 428/432, 428, 428/425.6, 425.9, 426, 49; 65/60.1, 60.5, 60.8, 33.1; 501/14, 5, 23, 26, 72, 71, 21, 70; 427/269, 376.2, 427

[56] References Cited

U.S. PATENT DOCUMENTS

| | | | |
|---|---|---|---|
| 3,804,666 | 4/1974 | Eppler et al. | 117/125 |
| 4,004,935 | 1/1977 | Grosvenor et al. | 106/48 |
| 5,091,345 | 2/1992 | Becker | 501/14 |

FOREIGN PATENT DOCUMENTS 971208681  11/1997  European Pat. Off. .

OTHER PUBLICATIONS

Barbieri et al., "Nucleation and Crystallization of a Lithium Aluminosilicate Glass," Journal of the American Ceramic Society, Dec. 1997, pp. 3077–3083.

*Primary Examiner*—Deborah Jones
*Assistant Examiner*—Abraham Bahta
*Attorney, Agent, or Firm*—Rankin, Hill, Porter & Clark LLP

[57] ABSTRACT

The present invention provides a glaze composition for use in forming glossy ceramic tiles which exhibit excellent scratch resistance. The glaze composition comprises a glass component that when fired produces a glaze layer containing oxides having a spinel crystalline structure and residual glass. The glaze displays an opaque or semiopaque finish.

16 Claims, No Drawings

TILE GLAZE

FIELD OF INVENTION

The present invention concerns a glaze composition for use in forming a glossy scratch resistant surface on ceramic architectural tile.

BACKGROUND

The prior art provides various methods for forming ceramic tiles for architectural applications, and also provides various glaze compositions which are used to produce the top surface or wear surface of the tile. Generally, a raw tile, sometimes referred to as a green or unfired ceramic body, is formed from natural or synthetic raw materials such as clays, kaolin, feldspars, wollastonite, talc, calcium carbonate, dolomite, calcined kaolin, oxides such as alumina, silica, corundum and mixtures of the foregoing. Binders and other additives may also be employed to increase the raw mechanical strength of the body. Once formed, the body is dried.

In many instances, a glaze composition is applied to the body either before (single firing) or after (double firing) the body is fired. Upon firing, the body forms a biscuit which is hard, tough and brittle, and the glaze composition forms a vitreous, transparent or opaque surface that can have a glossy or dull (matte) appearance. Glazes generally comprise one or more glass frits, fillers, pigments and other additives which either vitrify or sinter, depending upon the composition of the glaze and degree of firing.

For some architectural applications, it would be advantageous if the surface of a glazed ceramic tile could exhibit excellent scratch resistance and glossiness. Scratch resistance is typically measured on the Mohs Scale, which is an empirical scale of hardness based upon the ability of a surface to resist scratching when abraded by a material of known hardness, such as by feldspar (Mohs 6) or quartz (Mohs 7). For example, if the surface of a glazed tile resists scratching when abraded with feldspar, the surface is said to have passed at the Mohs 6 level.

Glossiness refers to the specular reflection of light off the surface of a material. Glossiness varies according to the incident angle of the light, and thus comparisons of glossiness must be made based upon measurements taken at the same incident angle. Glossiness measurements are reported in terms of the amount of light reflected relative to a defined standard mirror material which is considered to reflect 100% of the incident light.

Prior art glaze compositions have been able to produce ceramic tiles which exhibit excellent scratch resistance (hardness) or glossiness, but not both. Glossy ceramic tiles presently available in the market typically exhibit scratch resistance (hardness) of Mohs 4 or 5. Scratch resistant ceramic tiles (Mohs 7 or 8) presently available in the market have matte (non-glossy) surfaces and in some cases appear very rough, exhibiting a stone or cement-like appearance. A glaze composition is desired that can produce ceramic architectural tiles which have both excellent scratch resistance and glossiness.

SUMMARY OF THE INVENTION

The present invention provides a new and improved glaze composition for use on ceramic architectural tile which produces a glossy surface that displays excellent scratch resistance. The glaze composition comprises one or more glass components and optional additives. Upon firing, the glass (frit(s)) component vitrifies and forms crystals containing the spinel structure, which provide excellent scratch resistance, and residual glass, which provides glossiness. The glaze displays an opaque or semiopaque finish.

The glass component comprises from about 25% to about 60% by weight $SiO_2$, from about 10% to about 40% by weight $Al_2O_3$, up to about 10% by weight CaO, up to about 15% by weight BaO, up to about 20% by weight MgO, up to about 30% by weight ZnO, up to about 15% by weight $K_2O$, up to about 15% by weight $Na_2O$, from about 0% to about 10% by weight $Li_2O$, up to about 5% by weight $ZrO_2$, up to about 10% by weight $TiO_2$, up to about 5% by weight $P_2O_5$, and up to about 10% by weight $B_2O_3$. The glass component may also include up to about 10% by weight PbO. However, use of PbO is not required. The total alkali ($Li_2O$, $Na_2O$, $K_2O$) content should be less than about 15% by weight, and the total of MgO and ZnO should be from about 5% to about 30% by weight.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION

The novel glaze composition of the present invention is particularly well-suited for application on ceramic architectural tiles. However, because the glaze produces a glossy surface which exhibits excellent scratch resistance, it may be suitable for other applications as well, such as, for example, chinaware, dinnerware, fine bone china and sanitary ware.

The glaze composition of the present invention comprises one or more glass frits and optional vehicles and additives. Preferably, the glass component which comprises one or more glass frits provides a composition as follows:

| Component | Range (Wt %) | Preferred Range (Wt %) |
|---|---|---|
| $SiO_2$ | 25–60 | 35–55 |
| $Al_2O_3$ | 10–40 | 20–35 |
| CaO | 0–10 | 0–5 |
| BaO | 0–15 | 0–10 |
| MgO | 0–20 | 0–15 |
| ZnO | 0–30 | 0–25 |
| $K_2O$ | 0–15 | 0–5 |
| $Na_2O$ | 0–15 | 0–10 |
| $Li_2O$ | 0–10 | 2–10 |
| $ZrO_2$ | 0–5 | 0–4 |
| $TiO_2$ | 0–10 | 2–8 |
| $P_2O_5$ | 0–5 | 0–3 |
| $B_2O_3$ | 0–10 | 0–5 |
| PbO | 0–10 | 0–5 |

It is critical that the total alkali ($Li_2O$, $Na_2O$, $K_2O$) content be less than about 15% by weight, because glazes with higher alkali content will not pass acid resistance tests. It is also critical that the total of MgO and ZnO be between about 5% to about 30% by weight. Some MgO or ZnO is necessary to form the spinel crystal structure phase during firing, however too much MgO or ZnO will result in a glaze composition that will not fire properly.

The glass frit or frits that comprise the glass component may be prepared utilizing conventional glass melting techniques. A conventional ceramic refractory, fused silica, or platinum crucible may be used to prepare the glass frit.

Typically, selected oxides or raw materials are smelted at temperatures of from about 1400° C. to about 1600° C. for about 1 to 2 hours. The molten glass formed in the crucible is then converted to glass frit using water-cooled steel rollers and milling equipment. It will be appreciated that the step of producing the glass frit is not per se critical and any of the various techniques well-known to those skilled in the art can be employed.

The glass component comprises from about 70% to about 100% by weight of the solids portion of the glaze composition. Preferably, the glass component comprises at least 90% by weight of the solids portion of the glaze composition. The term "solids portion" as used herein means that portion of the glaze that does not burn off or evaporate during firing. Thus, solids portion does not include vehicles, carriers or the like. Crystallization of the glaze composition occurs very rapidly and completely during firing, so no crystallization promoter is necessary. Moreover, the spinel crystals formed during firing have an expansion coefficient of about $80 \times 10^{-7}/°$ C., which is compatible with the ceramic tile body, so no expansion modifiers are necessary. It will be appreciated that the glaze composition may include additives and fillers such as vehicles, flocculants, antifoaming agents, deflocculants, binders, wetting agents, dyes, pigments, and other common mill additions.

The glaze composition of the present invention may be applied using any one of a variety of conventional application techniques. For example, the glaze composition may be applied wet or dry. Such application techniques such as disk and bell applications, spraying, screen printing, brushing and electrostatic applications may be employed.

The manner in which the glaze composition is to be applied has significant bearing on the manner in which the glaze composition is formulated. For example, if the glaze is to be applied using a wet application technique, the glass frit(s), in flake or granular form, and other additives can be ball milled together with a vehicle, frequently water, to a fineness on average of about 10 to about 30 microns. The resulting slip, which comprises generally from about 30% to about 50% by weight of vehicle, is then in condition for application upon a green ceramic body. Of course it will be appreciated that milling fineness and the amount of vehicle utilized in a slip is not critical, and can be varied to best accommodate the specific application technique being employed. Also, the vehicle may be water or any of the other conventional vehicles.

If the glaze composition is intended for dry or electrostatic application, the glaze can be dry milled or granulated. Other additives, such as, for example, glues, binders, and organopolysiloxanes, may be employed in the dry system. Milling fineness is not critical, and can be varied to optimize application of the glaze.

The glaze composition is applied to engobed green (unfired) ceramic architectural tiles at a rate of from about 0.20 to about 1.5 kg/m$^2$, and preferably from about 0.4 to about 0.7 kg/m$^2$. It will be appreciated that the application rate is not critical, and can be varied without significant impact on the resulting glazed surface. However, it is generally preferred that the application rate run from about 0.4 to about 0.7 kg/m$^2$ in order to afford optimum gloss.

Firing times will depend on the specific tile body, furnace conditions, and the size of the charge or load placed in the furnace or kiln. However, the coated ceramic bodies are fired for a period of from about 15 minutes to about 4 hours. Generally, the glaze composition of the present invention matures at a temperature of from about 1050° C. to about 1250° C. This relatively high firing temperature can make the glaze unsuitable for double firing on certain ceramic bodies, which generally occurs at lower temperatures.

The high firing temperature is necessary to form the residual glass portion of the glaze, which provides the glossiness. When a glazed tile is heated, the glaze becomes crystalline at about 700° C. to 800° C. In addition to a spinel phase, a lithium aluminosilicate phase such as virgilite, spodumene, eucryptite or beta quartz forms. However, these additional phases are generally the result of incomplete firing cycles. Tiles removed prior to a complete firing cycle show no residual glass in their x-ray patterns. As the tiles are heated further, the lithium aluminosilicate phase may undergo a solid—solid phase transition, but eventually melts when the tile reaches a temperature of from about 1100° C. to about 1250° C. When the tile cools down, surprisingly this phase does not recrystallize, and therefore remains as the residual glass and hence produces a glossy tile. Therefore, tiles fired below about 1100° C. will not have a glossy surface, because they are too crystalline.

After firing, the glaze composition displays the spinel crystal structure as the predominant phase, but can also include amounts of other phases such as forsterite, willemite, zinc titanate, magnesium titanate, cordierite, magnesium aluminum titanate, or rutile. The glaze displays about 20% to about 60% crystalline (predominantly spinel) structure, the remainder being residual glass that gives the tile its glossiness.

The spinel crystalline structure can be composed of $MgAl_2O_4$, which is commonly known as spinel, and/or $ZnAl_2O_4$, which is commonly known as zinc spinel. Spinel and zinc spinel are isostructural, and their x-ray patterns are virtually identical. The Mg and Zn ions are nearly the same size, and substitute for one another in the structure. Spinel is a hard mineral which passes Mohs 8. Zinc spinel is not as hard, but is more fusible and thus easier to make the pre-cursor frit. For simplicity, both of these phases are referred to as spinel herein, except where differentiation is necessary. The residual glass and spinel crystalline structure combination provides a glazed tile surface that is both glossy and passes Mohs 6, and sometimes Mohs 7 (pursuant to standard EN101 test procedures).

In summary, the present invention produces glazed ceramic tiles having wear surfaces that are both glossy and hard. It will be appreciated that by using specific additives or fillers such as, for example, alumina, the glaze composition can be utilized to produce surfaces that are opaque or semiopaque or of increased hardness. Additionally, the glaze composition of the present invention may be applied at significant thicknesses to facilitate mechanical polishing of the surface. Finally, it will be appreciated that in addition to ceramic architectural tile, the glaze composition of the present invention may be utilized in conjunction with other ceramic bodies, such as, for example, chinaware, dinnerware, fine bone china and sanitary ware.

The following examples are intended only to illustrate the invention and should not be construed as imposing limitations upon the claims:

EXAMPLES

Unless otherwise indicated, all parts and percentages are by weight and all temperatures are in degrees Centigrade (° C.). The ceramic tile bodies employed in the Examples were conventional in nature, composed principally of clay with silica, feldspar and other conventional additives included. The green (unfired) ceramic tile bodies were all engobed with a suitable engobe (such as FE.ENG 304, which is available from Ferro Corporation (Italy) of Casinalbo, Italy) prior to application of the glaze composition. Glass Frits 1, 2 and 3 were prepared utilizing conventional glass making techniques to provide the following compositions by weight percent:

| Component | Frit 1 | Frit 2 | Frit 3 |
|-----------|--------|--------|--------|
| $SiO_2$   | 43.0   | 44.5   | 37.1   |
| $Al_2O_3$ | 23.2   | 30.2   | 39.4   |
| MgO       | 7.7    | 9.0    | 15.6   |
| ZnO       | 15.5   | 6.0    | 0      |
| $Na_2O$   | 4.7    | 0      | 1.9    |
| $Li_2O$   | 2.3    | 4.4    | 2.3    |
| $TiO_2$   | 3.6    | 5.9    | 3.7    |

Example I

Glass Frit 1 was melted using conventional melting techniques and roller quenched to form frit flakes. The glaze composition was prepared by ball milling 100 parts frit by weight with 70 parts water by weight, along with 1 part by weight bentonite clay and 0.3 parts by weight sodium carboxymethylcellulose (CMC). The milling residue on a 40 micron sieve being about 0.1% to 0.2% by weight. The glaze was applied to an engobed conventional green ceramic tile body at a rate of 0.4 to about 0.7 kg/m$_2$. The tile was then subjected to a firing cycle of 70 minutes with a maximum temperature of 1190° C. The resultant tile had a smooth surface with a gloss value of 116 (measured at a 60° angle). The tile passed a scratch test at Mohs 5 (according EN 101 standard) and the surface was not attacked by acids (class AA according to EN 122 standard).

Example II

Glass Frit 2 was melted using conventional melting techniques and roller quenched to form frit flakes. The glaze composition was prepared by ball milling 100 parts frit by weight with 60 parts water by weight, along with 1 part by weight bentonite clay and 0.3 parts by weight sodium carboxymethylcellulose (CMC). The milling residue on a 40 micron sieve being about 0.1% to 0.2% by weight. The glaze was applied to an engobed conventional green ceramic tile body at a rate of 0.4 to about 0.7 kg/m$_2$. The tile was then subjected to a firing cycle of 70 minutes with a maximum temperature of 1190° C. The resultant tile had a smooth surface with a gloss value of 93 (measured at a 60° angle). The tile passed a scratch test at Mohs 6 (according EN 101 standard) and the surface was not attacked by acids (class AA according to EN 122 standard).

Example III

Glass Frit 3 was melted using conventional melting techniques and roller quenched to form frit flakes. The glaze composition was prepared by ball milling 100 parts frit by weight with 70 parts water by weight, along with 1 part by weight bentonite clay and 0.3 parts by weight sodium carboxymethylcellulose (CMC). The milling residue on a 40 micron sieve being about 0.1% to 0.2% by weight. The glaze was applied to an engobed conventional green ceramic tile body at a rate of 0.4 to about 0.7 kg/m$_2$. The tile was then subjected to a firing cycle of 70 minutes with a maximum temperature of 1190° C. The resultant tile had an "orange peel" (semi-glossy) surface with a gloss value of 38 (measured at a 60° angle). The tile passed a scratch test at Mohs 7 (according EN 101 standard) and the surface was not attacked by acids (class AA according to EN 122 standard).

What is claimed is:

1. A ceramic tile comprising a fired ceramic body having a top surface, said top surface being provided with a glaze layer having a specular gloss value of about 38 or greater measured at a 60° angle, said glaze layer being formed by firing a glaze composition comprising a glass component that when fired produces a glaze layer containing both a crystalline portion and residual glass portion, said crystalline portion comprising predominantly a spinel phase.

2. A ceramic tile as in claim 1 where said glass component comprises from about 25% to about 60% by weight $SiO_2$, from about 10% to about 40% by weight $Al_2O_3$, up to about 10% by weight CaO, up to about 15% by weight BaO, up to about 20% by weight MgO, up to about 30% by weight ZnO, up to about 15% by weight $K_2O$, up to about 15% by weight $Na_2O$, from about 0% to about 10% by weight $Li_2O$, up to about 5% by weight $ZrO_2$, up to about 10% by weight $TiO_2$, up to about 5% by weight $P_2O_5$, up to about 10% by weight $B_2O_3$, and up to about 10% by weight PbO, the total amount of $Li_2O$, $Na_2O$, and $K_2O$ being less than about 15% by weight, and the total amount of MgO and ZnO being from about 5% to about 30% by weight.

3. A ceramic tile as in claim 1 wherein said glass component comprises from about 35% to about 55% by weight $SiO_2$, from about 20% to about 35% by weight $Al_2O_3$, up to about 5% by weight CaO, up to about 10% by weight BaO, up to about 15% by weight MgO, up to about 25% by weight ZnO, up to about 5% by weight $K_2O$, up to about 10% by weight $Na_2O$, from about 2% to about 10% by weight $Li_2O$, up to about 4% by weight $ZrO_2$, from about 2% to about 8% by weight $TiO_2$, up to about 3% by weight $P_2O_5$, up to about 5% by weight $B_2O_3$, and up to about 5% by weight PbO, the total amount of $Li_2O$, $Na_2O$, and $K_2O$ being less than about 15% by weight, and the total amount of MgO and ZnO being from about 5% to about 30% by weight.

4. A ceramic tile as in claim 1 wherein said glaze layer has a Moh's hardness of about 5 or greater.

5. A ceramic tile as in claim 1 wherein said glaze layer has a Moh's hardness of about 6 or greater.

6. A ceramic tile as in claim 1 wherein said glaze layer has a Moh's hardness of about 7 or greater.

7. A ceramic tile as in claim 1 wherein said crystalline portion comprises from about 20% to about 60% by weight of said glaze layer.

8. A ceramic tile as in claim 1 wherein said crystalline portion further comprises in addition to said predominant spinel phase, one or more crystalline phases selected from the group consisting of forsterite, willemite, zinc titanate, magnesium titanate, cordierite, magnesium aluminum titanate, and rutile.

9. A ceramic tile as in claim 1 wherein said glaze layer has a specular gloss of about 93 or greater measured at a 60° angle.

10. A ceramic tile as in claim 9 where said glass component comprises from about 25% to about 60% by weight $SiO_2$, from about 10% to about 40% by weight $Al_2O_3$, up to about 10% by weight CaO, up to about 15% by weight BaO, up to about 20% by weight MgO, up to about 30% by weight ZnO, up to about 15% by weight $K_2O$, up to about 15% by weight $Na_2O$, from about 0% to about 10% by weight $LiO_2$, up to about 5% by weight $ZrO_2$, up to about 10% by weight $TiO_2$, up to about 5% by weight $P_2O_5$, up to about 5% by weight $B_2O_3$, and up to about 10% by weight PbO, the total amount of $Li_2O$, $Na_2O$, and $K_2O$ being less than about 15% by weight, and the total amount of MgO and ZnO being from about 5% to about 30% by weight.

11. A ceramic tile as in claim 9 wherein said glass component comprises from about 35% to about 55% by weight $SiO_2$, from about 20% to about 35% by weight $Al_2O_3$, up to about 5% by weight CaO, up to about 10% by weight BaO, up to about 15% by weight MgO, up to about 25% by weight ZnO, up to about 5% by weight $K_2O$, up to about 10% by weight $Na_2O$, from about 2% to about 10% by weight $LiO_2$, up to about 4% by weight $ZrO_2$, from about 2% to about 8% by weight $TiO_2$, up to about 3% by weight $P_2O_5$, up to about 5% by weight $B_2O_3$, and up to about 5% by weight PbO, the total amount of $Li_2O$, $Na_2O$, and $K_2O$ being less than about 15% by weight, and the total amount of MgO and ZnO being from about 5% to about 30% by weight.

12. A ceramic tile as in claim 9 wherein said glaze layer has a Moh's hardness of about 5 or greater.

13. A ceramic tile as in claim 9 wherein said glaze layer has a Moh's hardness of about 6 or greater.

14. A ceramic tile as in claim 9 wherein said glaze layer has a Moh's hardness of about 7 or greater.

15. A ceramic tile as in claim 9 wherein said crystalline portion comprises from about 20% to about 60% by weight of said glaze layer.

16. A ceramic tile as in claim 9 wherein said crystalline portion further comprises in addition to said predominant spinel phase, one or more crystalline phases selected from the group consisting of forsterite, willemite, zinc titanate, magnesium titanate, cordierite, magnesium aluminum titanate, and rutile.

* * * * *